United States Patent [19]

Baldwin et al.

[11] 4,292,000

[45] Sep. 29, 1981

[54] THRUST NUT LOCK RETAINER

[75] Inventors: Bryce R. Baldwin; Laurence M. Brady; Warren N. Holcomb, all of Indianapolis, Ind.

[73] Assignee: General Motors Corporation, Detroit, Mich.

[21] Appl. No.: 95,091

[22] Filed: Nov. 16, 1979

[51] Int. Cl.³ .......................... B25G 3/00; F16D 1/00; F16G 11/00
[52] U.S. Cl. .................................... 403/320; 416/174; 403/27; 403/406
[58] Field of Search ................. 403/320, 27, 406, 409, 403/316; 411/201, 212, 273; 285/89, 92

[56] References Cited

U.S. PATENT DOCUMENTS

| | | | |
|---|---|---|---|
| 2,318,590 | 5/1943 | Boynton | 285/92 XU |
| 3,385,613 | 5/1968 | McCall | 285/92 |
| 3,395,934 | 8/1968 | Rosan et al. | 285/92 X |
| 4,210,372 | 7/1980 | McGee et al. | 403/320 X |

FOREIGN PATENT DOCUMENTS 1933166 12/1977 Fed. Rep. of Germany ...... 403/320

Primary Examiner—Wayne L. Shedd
Attorney, Agent, or Firm—J. C. Evans

[57] ABSTRACT

A propeller shaft nut lock assembly for retention of a propeller shaft bearing assembly includes an externally threaded shaft surface threadably receiving a thrust nut that includes an outboard undercut groove therein to receive a cup lock that is shifted to locate an eccentric segment on the cup lock into interlocking engagement with the undercut groove when a thrust nut lock centers the cup lock on the assembly, and wherein the cup lock includes a plurality of axially extending bendable tangs to indicate that the thrust nut lock assembly is seated in load transfer relationship with the bearing assembly.

2 Claims, 5 Drawing Figures

THRUST NUT LOCK RETAINER

The invention herein described was made in the course of work under a contract or subcontract thereunder with the Department of Defense.

This invention relates to aircraft engine propeller assemblies and, more particularly, to a thrust nut lock for securing a bearing housing on an aircraft propeller shaft. In aircraft propeller installations, a propeller shaft extends from a reduction gear case having a load transfer bearing mounted therein at its forward end. Propeller shaft thrust is transmitted to the engine reduction gear case through thrust components of the load transfer bearing which also carries transverse loads. The races of the bearings are held in place on the shaft between a shoulder and a thrust bearing nut.

An object of the present invention is to improve such assemblies by the provision therein of a cup lock having an eccentric segment thereon that passes over drive splines of a thrust nut, and wherein the cup lock includes a peripheral portion engageable with a thrust nut lock ring which is insertable into the cup lock bore to displace it to one side whereby the eccentric segment on the cup lock interlockingly engages the thrust nut behind the drive splines thereon; the thrust nut lock ring fully engaging splines on the propeller shaft and the drive splines on the thrust nut once the cup lock is aligned into its interlocking relationship with the thrust nut whereby, when tangs on the cup lock are bent into indexing slots on the thrust nut lock ring, the component parts of the thrust nut lock assembly are properly secured in place on the propeller shaft.

Further objects and advantages of the present invention will be apparent from the following description, reference being had to the accompanying drawings wherein a preferred embodiment of the present invention is clearly shown.

Figure 1:
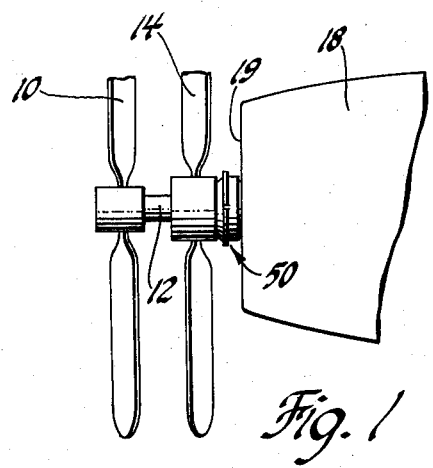
FIG. 1 is a conventional representation of an aircraft reduction gear and propeller combination with a thrust nut lock assembly in accordance with the present invention.

Referring to FIG. 1, a propeller assembly is illustrated, including a first propeller 10 mounted on an inner shaft 12, and a second propeller 14 mounted on an outer shaft 16 which is telescoped over the outer surface of the shaft 12. The propeller shafts 12, 16 extend from and are mounted with respect to a reduction gear case 18 which includes the gearing for transferring power from a gas turbine engine or the like to the propeller shafts 12, 16, thence to the propellers 10, 14, respectively.

The illustrated propeller and shaft arrangement is merely representative of one system which is suitable for use with the present invention. The dual shaft arrangement can be replaced by a single shaft drive of a propeller and be equally suited for use with the present invention.

Figure 2:
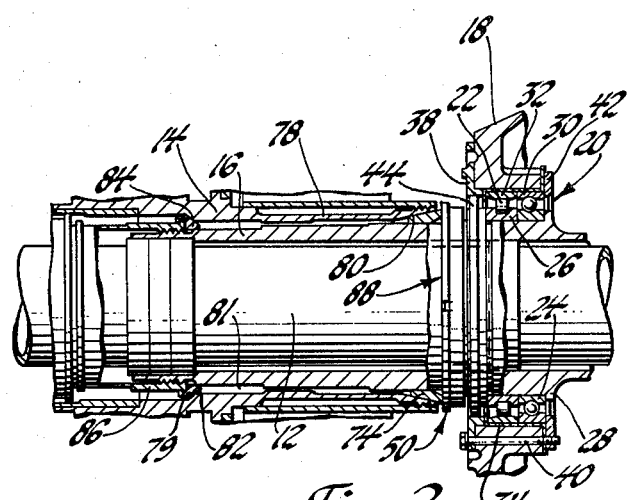
FIG. 2 is a partial sectional view through the propeller shaft and thrust nut lock assembly of the present invention.

Referring now more particularly to FIG. 2, the propeller shaft 12 extends axially of the hollow interior of the outer propeller shaft 16 and each of the shafts has an extension thereon that projects outboard of the outer face 19 of the reduction gear case 18.

The shaft 16 is supported by a ball bearing 20 and a roller bearing 22 having inner races 24, 26, respectively, that abut against one another.

The inner race 24 of the ball bearing 20 more specifically is seated against a radially extending shoulder 28 on the inboard end of the shaft 16. The outer races 30, 32 of the ball bearing 20 and roller bearing 22, respectively, are mounted in a bearing cage 34 seated within an opening 36 in the reduction gear case 18 where they are held in place by an outboard retaining ring 38 secured in place by suitable fastening means, such as the illustrated screws 40 which extend through the reduction gear case 18 into threaded engagement with an inboard retainer plate 42 held against case 18 by screws 40.

If desired, a seal ring 44 can be located within the outboard retaining ring 38, as shown in FIG. 2, to seal against the outer surface 46 of the thrust nut 48 of an improved thrust nut lock assembly 50 in accordance with the present invention.

The thrust nut 48 is internally threaded to be threadably engaged with an externally threaded portion 52 on the shaft 16, and when the thrust nut 48 is secured against the roller bearing 22 it will have an inboard face 54 thereon held against the inner race 26 of the roller bearing 22 to hold the bearing assemblies 20, 22 in place within the reduction gear case 18. Immediately outboard of the externally threaded portion 52 of the shaft 16 is a ring of external indexing splines 56 which mesh with internal indexing splines 58 on a thrust nut lock ring 60. The thrust nut lock ring 60 includes an inboard extension 62 of cylindrical form having a ring of internal indexing splines 64 thereon which are in meshed engagement with an outboard externally formed ring of drive splines 66 on a small diameter extension 68 from the thrust nut 48.

When the nut lock ring 60 is slid into engagement with both sets of the splines 56, 66, the thrust nut 48 will be positively locked against rotation with respect to the shaft 16. The indexing splines 56, 58 and set of meshed splines 64, 66 have a wide range of the indexing positions made possible by a large number of spline teeth. Once the thrust nut 48 is threaded in place, the lock ring 60 can be located to hold the nut 48 in its axially inwardly threaded location against inner race 26.

No special retainer is required for the thrust nut lock 60 once it is in place with respect to the sets of splines. The thrust nut lock 60, in this position, will have a radial inboard face 70 thereon located against the outer radial face 72 on small diameter extension 68. The propeller structure includes a cone 74 on the shaft 16 that abuts the outer face 76 of the thrust nut lock ring 60. A hub 78 of the second propeller 14 includes an internal conical surface 80 thereon that seats on the cone 74. The hub 78 further includes an outboard conical surface 79 thereon in engagement with a conical surface 82 of an outboard retainer cone 84 which is tightened on the propeller shaft 16 by a threaded ring or collar 86. The propeller hub 78 is thus retained on the two cones 74, 84 by the collar 86. The arrangement is a well known propeller mounting system, and when the propellers 10, 14 are in place, thrust nut lock 60 is held against back-off from the splines 56 on the shaft 16 and away from the thrust nut 48.

Figure 4:
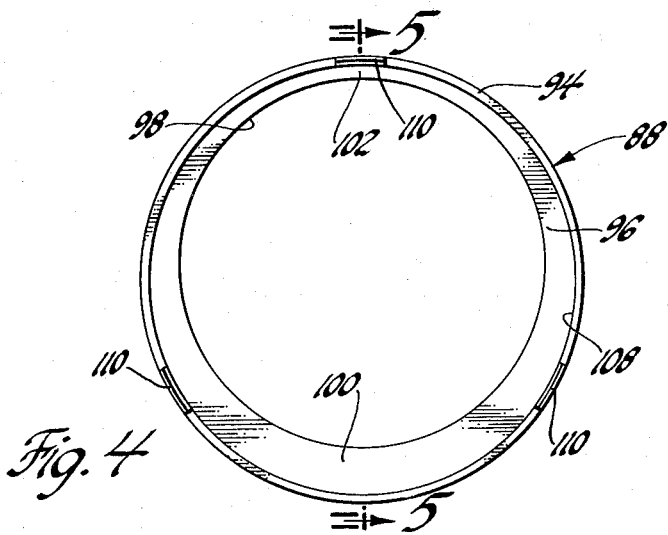
FIG. 4 is an end elevational view of a cup lock used in the present invention.
Figure 5:
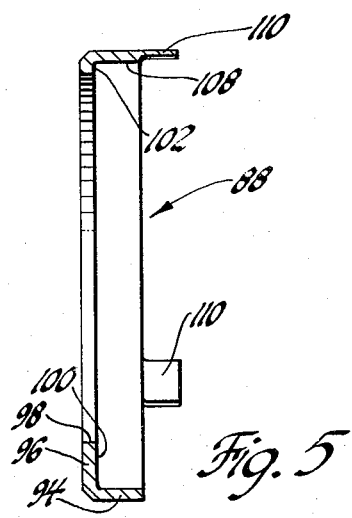
FIG. 5 is a vertical sectional view taken along the line 5—5 of FIG. 4 looking in the direction of the arrows.

In accordance with the present invention, the thrust nut lock assembly 50 includes a cup lock 88 that is operative to indicate the desired axial positioning of the thrust nut 48 and the thrust nut lock 60 with respect to the bearing assemblies 20, 22. More specifically, the cup lock 88, shown in FIGS. 4 and 5, includes an outer circular peripheral flange 94 having a locater flange 96 connected to one end thereof and including an opening 98 therein which is eccentrically disposed with respect to the peripheral flange 94. Thus the locater flange 96 includes a side segment 100 thereon of greater depth than an opposed side segment 102. The diameter of the opening 98 is selected so that the cup lock 88 will fit over the outer diameter of the ring of drive splines 66 on the thrust nut 48. Thus when the parts are initially assembled, first, the thrust nut 48 is threaded in place into engagement with the inner race 26 and thereafter the cup lock 88 is slipped over the splines 66. At this point, the locater flange 96 is aligned with the thrust nut 48 at an annular undercut groove 104 thereon that will serve as a locking groove for the side segment 100 when the thrust nut lock ring 60 is slipped onto the axial splines 56, 66 once the thrust nut 48 is seated against the bearing assemblies 20, 22.

Figure 3:
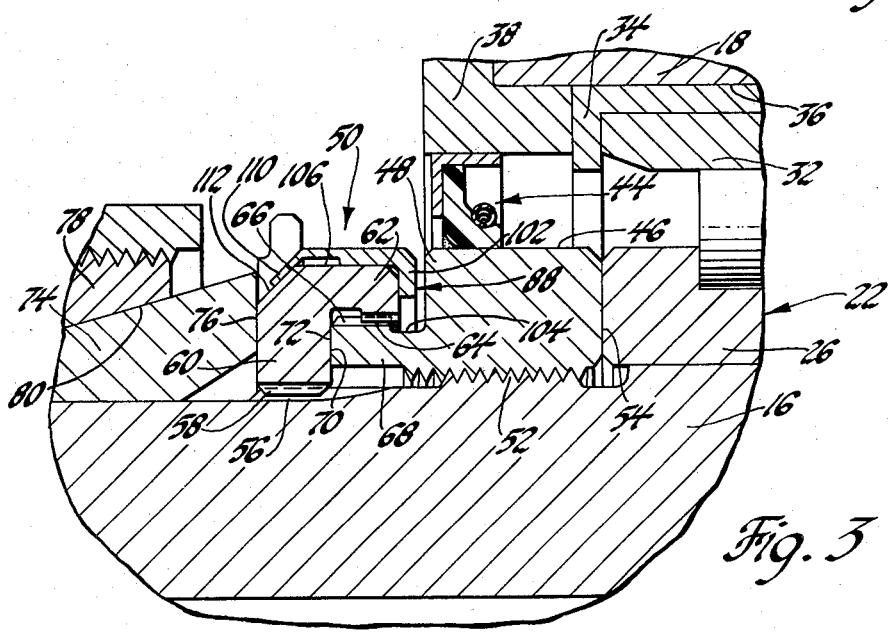
FIG. 3 is an enlarged fragmentary sectional view of the improved thrust nut lock assembly of the present invention.

When this occurs, an outer peripheral surface 106 on ring 60 will engage the inner peripheral surface 108 of peripheral flange 94 to cause the side segment 100 of the locater flange 96 to be moved into interlocking engagement with the annular groove 104 so that the cup lock 88 is in interlocking engagement with the thrust nut 48. At this point, three circumferentially spaced axially extending tangs 110 on the peripheral flange 94 are located with respect to circumferentially located, peripheral locking and index slots 112 in the thrust nut lock ring 60 at the outer face 76 thereon. One of the slots 112 is shown in FIG. 3. Thus, when the thrust nut lock ring 60 is inserted into the cup lock 88, it will be displaced to one side to cause the side segment 100 to be located behind the drive splines 66 of the thrust nut 48. The thrust nut lock ring 60 must fully engage both sets of splines 56, 66 before the tangs 110 of the cup lock 88 will align with locking slots 112. Thus, when the tangs 110 of the cup lock 88 are bent down into the slots 112, the parts are then properly placed with respect to the remaining components of the thrust nut lock assembly 50.

In the illustrated arrangement, no clamping load is carried through the cup lock 88 nor is any externally applied load reacted on this part of the assembly 50. The cup lock 88 constitutes an indicator component. The load carrying faces represented by cone 74 and outer face 76 are properly aligned to carry clamp loads that are directed therefrom, thence to the thrust nut lock ring 60 with its radial face 70 transferring the clamp load to thrust nut 48 which has its load applying inboard face 54 in engagement with the inner race 26 of roller bearing 22.

While the embodiments of the present invention, as herein disclosed, constitute a preferred form, it is to be understood that other forms might be adopted.

The embodiments of the invention in which an exclusive property or privilege is claimed are defined as follows:

1. A propeller shaft nut lock assembly for maintaining a propeller shaft bearing assembly in place within a bearing housing comprising: an externally threaded surface on a propeller shaft located outboard of the bearing assembly, a thrust nut threaded on said shaft to axially hold the bearing assembly in place within the bearing housing, said thrust nut including an undercut locking groove therein and an outboard extension with a splined surface, said shaft having a splined surface, a cup lock slidably positioned over said outboard extension and including an eccentric flange thereon initially radially positioned out of said lock groove and including a centering peripheral flange thereon initially located eccentrically with respect to the outer surface of said shaft, a thrust nut lock ring slidably mounted on said shaft engaging the centering peripheral flange to center it with respect to the shaft and to shift said eccentric flange into interlocked engagement with said groove, said thrust nut lock ring further having splined surfaces thereon engaging the two aforementioned splined surfaces, and coacting means to indicate axial seated engagement of said thrust nut lock ring against said thrust nut and radial shift of the eccentric flange into its interlocked engagement with the locking groove when said thrust nut is properly positioned with respect to the bearing assembly.

2. A propeller shaft nut lock assembly for maintaining a propeller shaft bearing assembly in place within a bearing housing comprising: an externally threaded surface on a propeller shaft located outboard of the bearing assembly, a thrust nut threaded on said shaft to axially hold the bearing assembly in place within the bearing housing, said thrust nut including an undercut locking groove therein and an outboard extension with a splined surface, said shaft having a splined surface, a cup lock slidably positioned over said outboard extension and including an eccentric flange thereon initially radially positioned out of said lock groove and including a centering peripheral flange thereon initially located eccentrically with respect to the outer surface of said shaft, a thrust nut lock ring slidably mounted on said shaft engaging the centering peripheral flange to center it with respect to the shaft and to shift said eccentric flange into interlocked engagement with said groove, said thrust nut lock ring further having splined surfaces thereon engaging the two aforementioned splined surfaces, said cup lock having circumferentially spaced axially extending tangs thereon, said thrust nut lock ring having end slots thereon, said tangs being bendable into said slots to indicate axial seated engagement of said thrust nut lock ring against said thrust nut and radial shift of the eccentric flange into its interlocked engagement with the locking groove when said thrust nut is properly positioned with respect to the bearing assembly.

* * * * *